Figure 1:
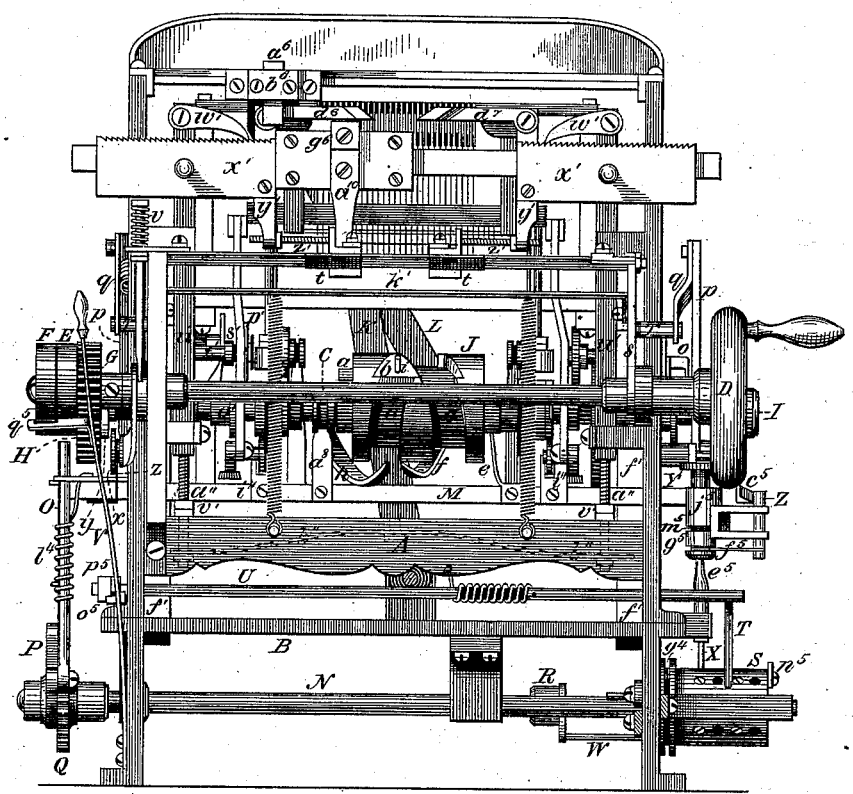

6 Sheets—Sheet 1.

E. TIFFANY.
Knitting-Machine.

No. 198,757. Patented Jan. 1, 1878.

WITNESSES.
Charles F. Prichard
F. G. Mattison

INVENTOR.
Eli Tiffany
by his Attorney,
Franklin Scott.

6 Sheets—Sheet 2.

E. TIFFANY.
Knitting-Machine.

No. 198,757. Patented Jan. 1, 1878.

WITNESSES,
Charles F. Prichard
F. G. Mattison

INVENTOR,
Eli Tiffany
by his Attorney,
Franklin Scott.

6 Sheets—Sheet 3.

E. TIFFANY.
Knitting-Machine.

No. 198,757. Patented Jan. 1, 1878.

WITNESSES.
Charles F. Prichard.
F. G. Mattison.

INVENTOR.
Eli Tiffany
by his Attorney
Franklin Scott.

6 Sheets—Sheet 4.

E. TIFFANY.
Knitting-Machine.

No. 198,757. Patented Jan. 1, 1878.

WITNESSES.
Charles F. Prichard.
F. G. Mattison.

INVENTOR.
Eli Tiffany,
By his attorney
Franklin Scott.

E. TIFFANY.
Knitting-Machine.

No. 198,757. Patented Jan. 1, 1878.

WITNESSES.
Charles F. Prichard
P. G. Mattison

INVENTOR.
Eli Tiffany,
by his Attorney
Franklin Scott

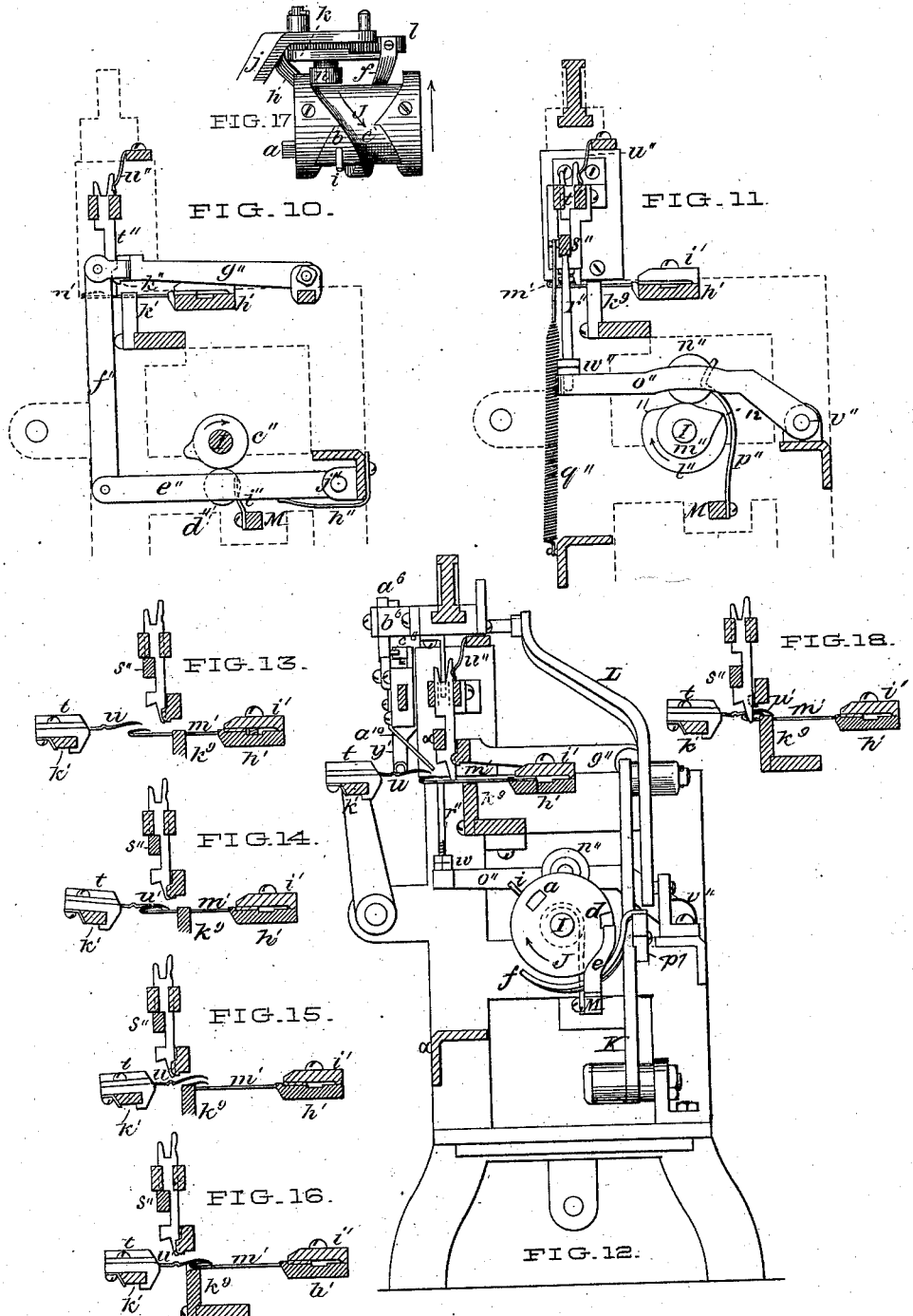

UNITED STATES PATENT OFFICE.

ELI TIFFANY, OF BENNINGTON, VERMONT, ASSIGNOR OF ONE-HALF HIS RIGHT TO CHARLES COOPER, OF SAME PLACE.

IMPROVEMENT IN KNITTING-MACHINES.

Specification forming part of Letters Patent No. 198,757, dated January 1, 1878; application filed June 27, 1877.

*To all whom it may concern:*

Be it known that I, ELI TIFFANY, of Bennington, in the county of Bennington and State of Vermont, have invented an Improved Full-Fashion Spring-Needle Knitting-Machine; and I do hereby declare the following to be a full, clear, and exact description of the construction and operation thereof, reference being had to the accompanying drawings, which constitute a part of this specification.

This improved spring-needle knitting-machine is designed to be used in the manufacture or production of that class of knit goods known to manufacturers and dealers as "full-fashioned" goods, and embracing shirts, drawers, stockings, jackets, &c., in fact, all garments the members or parts whereof are shaped or adapted to fit the form of the limb or the body of the wearer. This machine is adapted to automatically knit such constituent parts of the garment to any prescribed pattern, and accomplishes such result by the process called "narrowing"—that is, by commencing the knitting of the piece at its broadest end, and, as the knitting progresses, narrowing the breadth thereof by successive steps, so as to leave the selvages thereof of the shape desired, so that when such selvages are united to their respective companion parts or pieces the finished form of the member, body, or of the whole garment shall be attained.

Spring-needles are exclusively employed in this machine, and the mechanism for knitting, contradistinguished from the narrowing mechanism, independent of the main driving-cam and its appurtenances which actuates the slur-cocks, is substantially similar to that employed in the knitting-machine patented to me May 1, 1860, and extended April 30, 1874.

The novel elements in this machine are as follows: First, the cam and its appurtenances by which, in conjunction with a combination of levers, reciprocating motion is communicated to the slur-cock and yarn-carrier; second, the mechanism by which the position of the driver of the yarn-carrier (which is attached to the sliding head appended to the draw-lever) is shifted from one side of the projection on the yarn-carrier, by which the same is propelled to the opposite side thereof, at or near the completion of each stroke, and before the completion of the return movement; third, the system of mechanism embracing the pattern-cylinder, and the several parts governing its operation, by which the configuration of the selvage is predetermined, which pattern-cylinder is adapted to slide longitudinally on its actuating-shaft, and has its surfaces provided with parallel circumferential ranges of holes, which can be opened or closed as the peculiar form of the desired selvage may require; fourth, the mechanism by means of which, when brought into play, the operations of the knitting mechanism proper are suspended, and those of the narrowing mechanism initiated; fifth, the system of communicating motions to both the knitting and narrowing mechanisms through the agency of movable trucks, working upon or in conjunction with actuating-cams, which are rigidly attached to the cam-shaft or other part of the driving apparatus, the shipping arms or levers of all such trucks being attached to a single shipping-bar, so as to secure the suspension of action of the knitting mechanism simultaneously with the bringing into action of the narrowing mechanism, or vice versa; sixth, the mechanism and its mode of operation provided for stopping the machine when, in process of knitting and narrowing, the end of the pattern has been reached.

Similar letters in the several figures of the drawings refer to like or corresponding parts of the machine.

Figures 2, 19, 22:
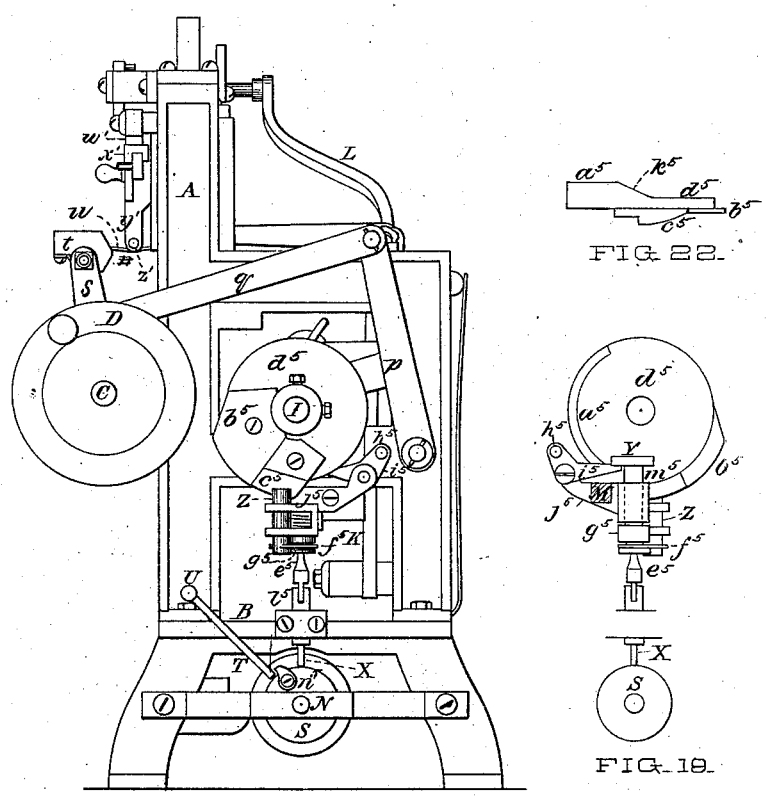
Figure 20:
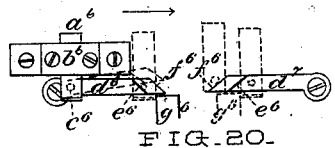
Figure 3:
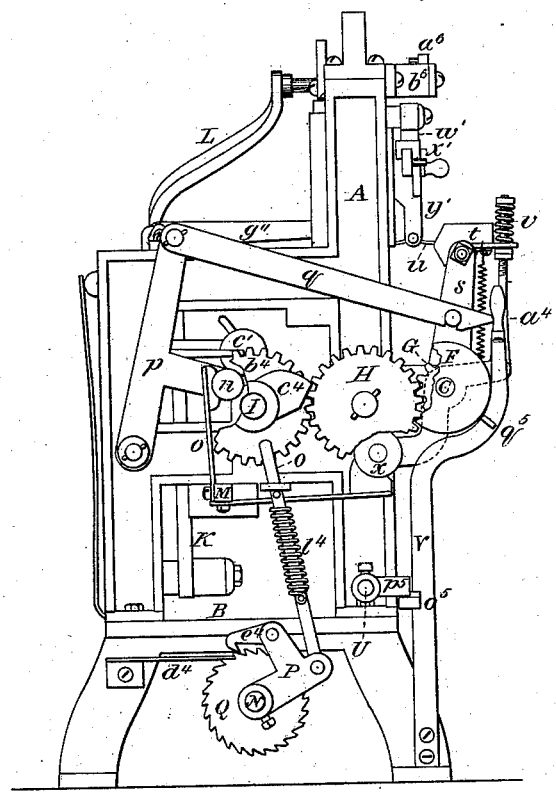
Figure 4:
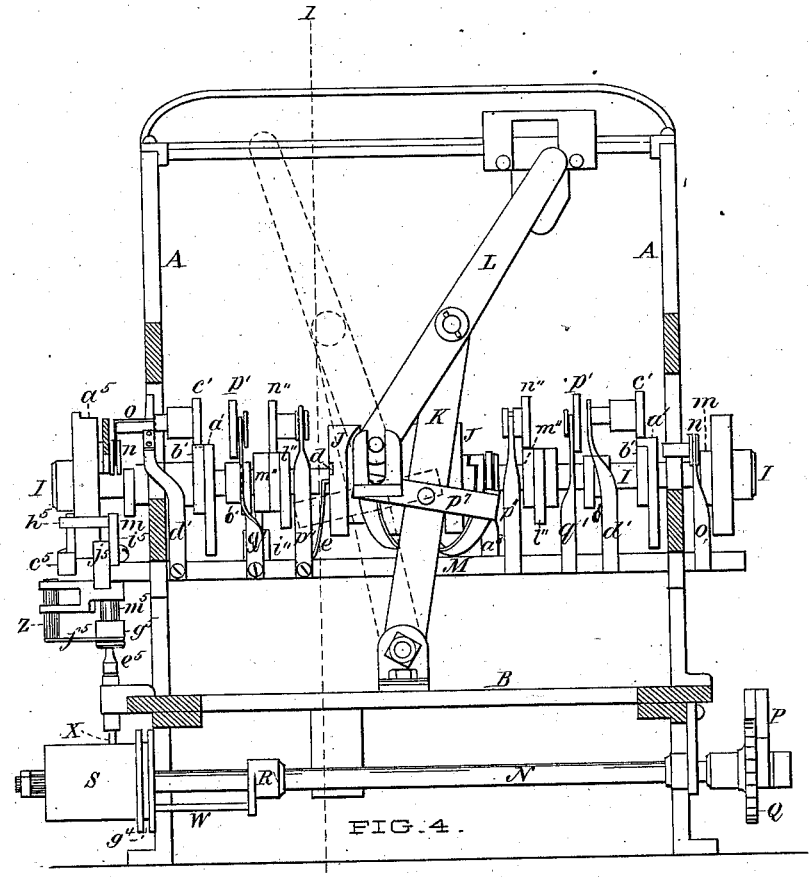
Figure 5:
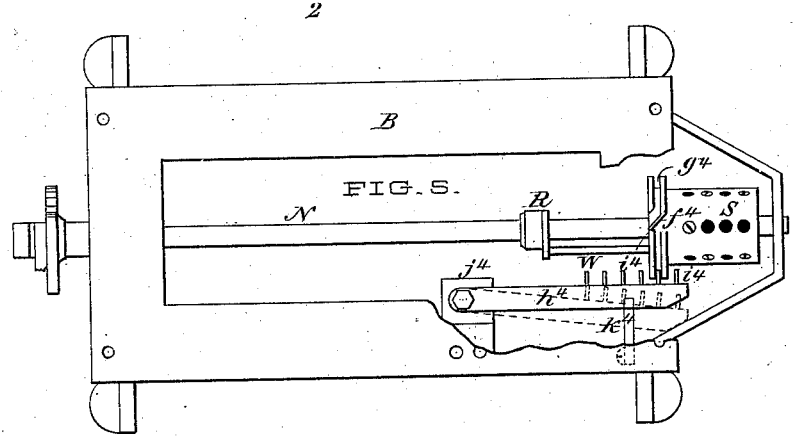
Figure 6:
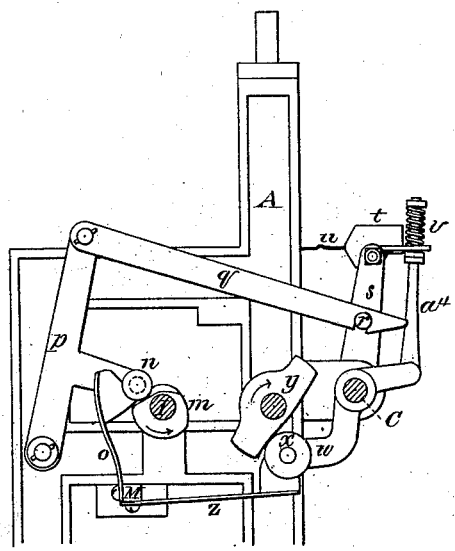
Figure 7:
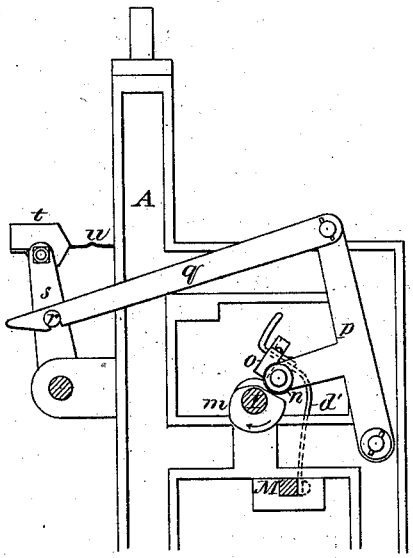
Figure 8:
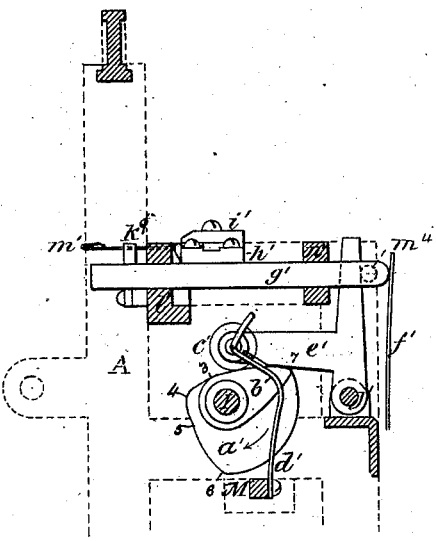
Figure 9:
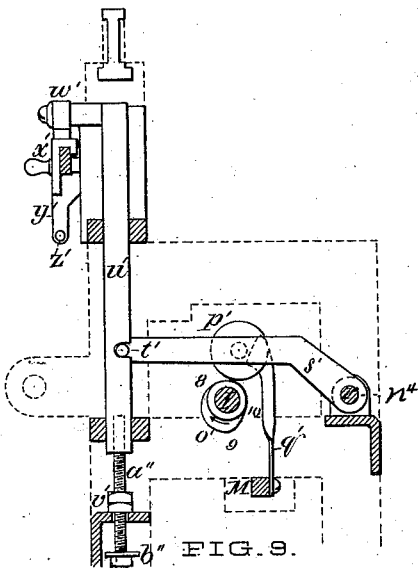

Figure 1 is a front elevation of the machine. Fig. 2 is a view, in elevation, of the right-hand end of the same. Fig. 3 is a view, in elevation, of the left-hand end of the same. Fig. 4 exhibits a rear elevation of a part of said machine, exhibiting the principal cam-shaft with cams thereon, and the several friction rolls or trucks, which work in conjunction therewith, together with the shipping-bar, to which are attached the several shipping-arms by which said trucks are shipped into and out of action, as well as the pattern-cylinder, with its attachments and connecting mechanism between same and cam on drive-shaft and shipping-bar. Fig. 5 shows, in plan, the pattern-cylinder and its appendages. Fig. 6 exhibits the mechanism by which the advancing, receding, and tilting or rocking movements of the narrowing-points are accomplished. Fig. 7 shows the mechanism at the opposite end of the machine for accomplishing the advancing and receding movements of the narrowing-point. Fig. 8 shows the cams, truck, levers, and slides for regulating the motions of the needle-bar, both in knitting and narrowing. Fig. 9 represents the mechanism which actuates the pawl and narrowing-rack, by which the traverse of the yarn-carrier is determined and the narrowing-points are moved up. Fig. 10 shows the mechanism for actuating the presser-bar. Fig. 11 exhibits the mechanism by means of which the sinkers are locked and held out of action while the operation of narrowing or effecting the transfer of stitches from one needle or set of needles to another is taking place. Fig. 12 exhibits a vertical cross-section, taken through the machine on the line 1 2 of Fig. 4, and, among other things, presents to view an end elevation of the cam which actuates the compound draw-levers, together with the guides which control the action of the switch; also, relative position of needle-bar, needles, narrowing-points, yarn-carrier, sinkers, presser-bar, narrowing-racks, draw-levers, &c. Figs. 13, 14, 15, 16, and 18, consecutively, show the relative positions of the narrowing-points, sinkers, and needles with reference to each other and to the stationary parts of the machine from the inception of the narrowing movement through the successive stages to the culmination thereof. Fig. 17 shows a top or plan view of the main driving-cam, exhibiting also a portion of the compound draw-lever, and the intervening devices, by use of which the desired reciprocatory movement of the yarn-carrier is obtained. Fig. 19 shows the inner aspect of the large disk, to which are attached the cams by which the movements of the shipping-bar, in connection with the narrowing-tackle, are governed. Fig. 20 illustrates the mechanism by which the vertically-movable driver by which the yarn-carrier is propelled is shifted from one to the other side of the projection on the yarn-carrier, against which it impinges, which movement takes place at or near the terminus of each stroke or traverse of the yarn-carrier. Fig. 22 shows an edge view of the large disk seen in side elevation in Fig. 19, exhibiting the cams by which the reciprocating movement of the shipping-bar is accomplished, and the cam which elevates the narrowing-tackle, hereinafter more particularly described.

The operative parts of this machine are mounted in and upon a suitable frame, A, resting upon a table, B. On the front of the machine is located the driving-shaft C, provided at left end with tight and loose pulley E and F and driving-gear G, and at right end with balance-wheel D. Gear G meshes with intermediate gear H, Fig. 3, upon the inside of which is the cam $y$, Fig. 6, which, in conjunction with truck $x$, lever $w$, pivoted on shaft $c$, connecting-rod $a^4$, and coil-spring $v$, communicates to the narrowing-points $u$ $u$ their requisite rocking or tilting movements. Truck $x$ is moved axially onto and off cam $y$ by shipping-arm $z$, attached to shipping-bar M. Gear H engages and actuates gear $b^4$ on cam-shaft I, and through the same, and the several cams thereto attached, motion to the various parts of the machine is transmitted. On the outer side of gear $b^4$ is attached, on cam-shaft I, the cam $c^4$, which, at each revolution of said gear $b^4$, will communicate to the connecting-rod O a reciprocating motion, the downward movement of which will, through the agency of elbow P and pawl $e^4$, with which the same is connected, communicate to the ratchet-wheel Q a progressive rotary movement of one notch. The return movement of the connecting-rod is secured by the action of the retractile spring $l^4$. Said ratchet-wheel Q is attached to one end of shaft N, which carries on its other end the pattern-cylinder S, Fig. 5, which is free to slide axially on said shaft within certain limits, but is prevented from rotating independently thereon by reason of the rod W, which enters a hole in said pattern-cylinder, and is connected at its outer end with hub R, which is firmly secured to said shaft N. The rotary movement of the pattern-cylinder depends on pawl and ratchet $e^4$ Q, and the longitudinal or axial movement upon the action of the cam-face $f^4$, which diagonally bisects the circumferential groove $g^4$, working against the pins $i^4$ $i^4$ of lever $h^4$, Fig. 5. Said groove and pins are so arranged that at each revolution of the pattern-cylinder S, when the diagonal face $f^4$ engages the pin in the groove $g^4$, the further rotation of the pattern-cylinder, on account of the resistance offered to cam-face $f^4$ by the pin in its path, will cause said pattern-cylinder to be forced axially toward hub R, so that the pin next adjacent to the one last engaged will enter the lateral opening of groove $g^4$, and thus bring into action a new range or series of holes on the pattern-cylinder. The lever $h^4$ is pivoted at one end to the frame, as at $j^4$, the other end being free to swing back, so as to disengage the pins $i^4$ $i^4$ from the groove $g^4$ when the same is not confined by the latch $k^4$, provided for the purpose of confining said pins in engagement with the groove of the pattern-cylinder S when the knitting is progressing. Pattern-cylinder S is provided with ranges of holes arranged rectangularly, so that the longitudinal series or ranges shall be coincident with the teeth of ratchet-wheel Q, and the circumferential ranges coincident with the pins $i^4$ $i^4$ of lever $h^4$.

Next in order, reading from the ends of shaft I, come cams $m$ $m$, Figs. 6 and 7, which, acting in conjunction with trucks $n$ $n$, elbow-levers $p$ $p$, connecting-rods $q$ $q$, arms $s$ $s$, having shaft C as their working-center, communicate to the sliding heads $t$ $t$, which carry the narrowing-points $u$ $u$, their appropriate advancing and receding movements in process of narrowing. Truck $n$ is moved axially onto and off cam $m$ by shipping-arm $o$, attached to shipping-bar M.

In Fig. 8 are shown the devices for operating the needle-bar. Cams $b'$ $b'$ on shaft I give to the needle-bar $h'$ $i'$, and thereby to the needles, their regular reciprocating movement during the process of knitting, which is accomplished through the agency of trucks $c'$ $c'$ and elbow-rockers $e'$ $e'$, the upper arms of which work against lugs $m^4$ $m^4$ on slides $g'$ $g'$, and carry the needle-bar $h'$ $i'$ and needles $m'$ backwardly, the return movement being effected through the instrumentality of springs $f'$ $f'$. Cams $a'$ $a'$, by reason of their shape, communicate to the needles, in the process of narrowing, four distinct movements. For the purpose of more clearly describing these separate but consecutive motions, I have designated points in the periphery of cam $a'$ by the figures 3, 4, 5, 6, and 7, which have reference especially to positions of the needles and narrowing-points shown in Figs. 13, 14, 15, 16, and 18, hereinafter more fully described. The adjacent cams $a'$ $a'$ and $b'$ $b'$ have a common periphery between the points marked 3 and 7, in Fig. 8; and it is while trucks $c'$ $c'$ are in conjunction with these common faces that the shipping of the same from one to the other takes place. Trucks $c'$ $c'$ are shipped by shipping-arms $d'$ $d'$ attached to shipping-bar M, as shown.

The mechanism for accomplishing the actual transfer of the marginal stitch or stitches from the needles on which they were formed to an interior set of needles, otherwise called "narrowing," is shown in Fig. 1, in part in front elevation, and in Fig. 9, in side elevation. Cams $o'$ $o'$, Figs. 9 and 4, communicate motion, through trucks $p'$ $p'$, to levers $s'$ $s'$, pivoted to the frame of the machine at $n^4$ $u^4$. To the front end of levers $s'$ $s'$ are attached lugs or pins $t'$ $t'$, which work in slots in the vertical slides $u'$ $u'$. To the upper end of the slides $u'$ $u'$ are pivoted the pawls $w'$ $w'$, the points of which engage in the ratchet-teeth of the narrowing-racks $x'$ $x'$. Said ratchet-teeth on said racks coincide with, or are the multiple of, the gage of the needle-bar. On the inner ends of said narrowing-racks are attached the cross-pieces $y'$ $y'$, through the lower extremities of which, and opposite the heads carrying the narrowing-points, are inserted the set-screws $z'$ $z'$, Fig. 1. These set-screws are provided with check-nuts, if necessary, and their function is to regulate the lateral adjustment of the narrowing-points with reference to the eyes of the needles. The narrowing-point head $t$, Fig. 1, is adjusted with gibs, or in any other suitable way, so as to slide on the bar $k'$, but tightly enough to maintain its position without becoming easily disarranged under ordinary circumstances. To the tops of said cross-pieces $y'$ $y'$, Fig. 1, are also attached the shifting-latches $d^6$ $d^7$ and the supports which prevent their dropping below a horizontal position. The said pawls receive their downward or operative movements from the spring $b''$, dotted, which is attached at its middle to a rail or breast-girt of the machine, and the extremities of which are connected with the slides $u'$ $u'$ by their screws $a''$ $a''$. The extent of movement of said pawls is adjusted by means of the check-nuts $v'$ $v'$ on screws $a''$ $a''$.

Upon the ends of the arms $s$ $s$, which are pivoted on shaft C, is attached the bar $k'$, upon which the heads $t$ $t$ slide which carry the narrowing-points.

In order that the sinkers may not interfere with the operation of narrowing until required, the mechanism illustrated in Fig. 11 is provided, the same being actuated by cam $l''$ on shaft I. The cam $m''$ (shown in Fig. 11) operates the sinkers, through the intervening mechanism, during the knitting operation; and at the point of contact between the cam $l''$ and truck $n''$ the faces of the adjacent cams $l''$ and $m''$ are coincident, to facilitate the shipping of truck $n''$ from one onto the other. As the narrowing process commences, the forward movement of cam $l''$ carries the high point 11 of said cam under truck $n''$, thus elevating lever $o''$, and consequently, by means of stud $r''$, the lock-out bar $s''$, which carries with it all the sinkers. Said parts are held in such dormant position until cam $l''$ has rotated the concentric portion of its periphery under truck $n''$ between the points 11 and 12, from which point the shape of cam $l''$ permits the sinkers to fall at the opportune moment, to arrest and hold back from being drawn off the needles by the narrowing-points the newly-transferred stitches.

The disk $d^5$ (shown in Fig. 19) is armed with three cams—viz., $a^5$, $b^5$, and $c^5$. These cams operate in conjunction with those parts of what is hereby designated the "narrowing-tackle" which are marked, respectively, Z, Y, and $h^5$. Said narrowing-tackle is composed of the vertically-sliding stud or pin X, connecting link $e^5$, vertically-sliding stud $m^5$, which carries on its top end the truck Y, and is connected at the bottom with top end of connecting-link $e^5$ by a ball-and-socket or other suitable joint.

When, in process of knitting, pattern-cylinder S is rotated so that one of the open holes is presented to pin X, the same will drop into said hole by the force of gravity, and all the superincumbent mechanism of the narrowing-tackle connected therewith will be correspondingly lowered, so that truck Y will fall into the path of cam $a^5$ and stud Z, out of reach of cam $c^5$.

The further revolution of cam $c^5$ will force shipping-bar M to ship the trucks off the knitting-cams and onto the narrowing-cams. Its further revolution will bring cam $b^5$ against pin $h^5$, thus raising the pin X out of the hole in the pattern-cylinder and stud Z into the path of cam $c^5$. The further revolution of said disk will bring cam $c^5$ into engagement with stud Z, and thus force shifting-bar M and its appurtenances back into position to resume knitting. At other times the narrowing-tackle is supported by pin X, resting upon cylinder S, between the holes therein. Stud $m^5$ slides or works in or through bracket $j^5$, which is attached to the end of shipping-bar M, and has attached to the rear part thereof, Figs. 2 and 19, the elbow $i^5$, provided with projection $h^5$. The front end of elbow $i^5$, Fig. 19, works under and against the truck Y when lifting the narrowing-tackle out of its working into its dormant position.

The stop-motion provided in this machine consists of the rock-shaft U, having the latch $p^5$ at one end, which works in conjunction with the catch $o^5$, attached to the belt-shipping lever V, and the projecting arm T at the other end, which is actuated by a projection on pattern-cylinder S, provided for that purpose, as at $n^5$; or, which is usually the case, when the pattern does not involve the employment of all the annular series of holes, a screw is inserted in one of the holes in the pattern-cylinder, immediately at or after the terminus of the pattern, and is left to project far enough, so that as the pattern-cylinder advances in its legitimate path said screw will engage the end of projecting arm T of rock-shaft U; and, by partially rotating the same, unlatch and release the latch $p^5$, thus permitting the spring shipping-bar V to ship the belt, and thereby stop the machine.

The operation of shifting the position of the driver which propels the yarn-carrier $a^{10}$ from one side of the lug thereon to the other is accomplished in this wise: Assuming the position of the several parts to be as shown in Fig. 20, the driver $a^6$ being in position to make a traverse from left to right, or in the direction of the arrow, said driver will advance until its lower end engages the projecting lug $g^6$ of the yarn-carrier, which will then be propelled concurrently with the driver $a^6$. When the pin $c^6$ on back side of driver $a^6$ engages the bevel face $e^6$ of shifting-latch $d^6$, said latch will be elevated to the position shown in dotted lines, and said pin $c^6$ will escape thereunder, and pursue its course until the pin thereon encounters the beveled or inclined face $f^6$ of shifting-latch $d^7$, upon which said pin will ascend, as indicated by dotted lines, until the driver has attained an elevation sufficient to destroy contact or engagement with lug $g^6$, whereupon the further advance of said lug and yarn-carrier will cease, and said pin, pursuing its path up over and upon the upper side of the beveled projection on shifting-latch $d^7$, will advance sufficiently that when said driver falls back into position it will be in the position shown in dotted lines across shifting-latch $d^7$, and be in position to make the return traverse, when the same series of movements will recur in a reversed order.

By reference to Figs. 1, 4, 12, and 17, the construction and operation of the mechanism which produces the reciprocatory movement of the slur-cock and yarn-carrier may be deduced.

When cam-shaft I is put in operation, assuming the position shown in Fig. 1 as a starting-point, that edge of the cam-groove of cylinder J which coincides with the inner edge of switch $b$ will, in course of revolution of said cylinder, impinge against truck $n$, as seen in Fig. 17, and from its nature cause the compound lever L K to make a sweep from left to right. In this operation the guide $h$, which is attached to one end of the cross-head $p^7$, is canted into an elevated position, ready to engage pin or lug $i$ of the switch-arm; and, in course of further revolution of cam J, the truck $n$ follows the track indicated by the arrow in Fig. 17 until the truck has taken position in that portion of the groove at the other or opposite end of the cam-cylinder, ready to be propelled or driven by the opposite edge of the cam-groove over to its original position. After the switch $b$ has passed the truck $n$ the lug $i$ is brought in contact with the inner edge of one or the other of the guides $f$ and $h$, and, by reason of their diagonal adjustment across or athwart the axis of the cam-cylinder J, said switch $b$ is crowded over to the opposite limit of its path of travel, so as to bring the other edge of said switch into position, ready to produce an opposite stroke.

A simple lever may be used in place of the compound lever K L in many machines, and is used by me in many machines of analogous construction to accomplish the same purposes; and I do not restrict myself in practice to either, but use a simple or compound lever of the kind shown, as convenience dictates.

In using this machine the configuration or contour of the piece to be produced is accomplished by narrowing, and the pattern is determined by leaving open certain holes in pattern-cylinder S, whose path comes under the pin X of the narrowing-tackle, and closing all other holes, so that the surface of said cylinder S shall be smooth and present no impediments to come in contact with the pin X of the narrowing-tackle, for at all times, except when in act of narrowing, the narrowing-tackle rests upon and is supported by those parts of the pattern-cylinder between the open holes therein.

The operation of the machine in narrowing is as follows: The knitting progresses until pawl $e^4$ and ratchet Q have rotated pattern-cylinder S so as to bring one of the holes therein under pin X of the narrowing-tackle, whereupon said pin drops of its own weight into said hole, and in its descent carries with it truck Y into position to be acted on by the cam $a^5$, and at the same time taking stud Z out of the path of cam $c^5$ on disk $d^5$. Next in order cam $a^5$, acting on truck Y, and consequently on shipping-bar M, with which the same is connected, forces said truck and shipping-bar to the left, and, by means of the several shipping-arms $z$, $o\ o$, $d'\ d'$, $q'\ q'$, $p''\ p''$, $i''\ i''$, and $a^8$, the several trucks and other devices connected with said shipping-arms are thrown out of action for purposes of knitting, and by same movement the latch $e$ is thrown into position, where it locks the cam-cylinder J by the catch upon the end thereof being inserted in slot $d$ of said cam-cylinder J. (Shown in Fig. 4.) The several trucks $x$, $n\ n$, $c'\ c'$, $p'\ p'$, and $n''\ n''$ at same time will be shipped into action with the several cams with which they are designed to co-operate, and everything is now in readiness for the commencement of the narrowing process, the needle-bar, spring-needles, and ticklers occupying the relative positions shown in Fig. 13. The first apparent movement is effected by cam $m$ on truck $n$, Fig. 6, the result of which is to commence an advancing movement of the ticklers up over the barbs of the needles. Then, by the action of cam $a'$ on truck $c'$, the needle-bar (through the intervening mechanism there shown) commences a concomitant, but slower, receding movement. Thus the ticklers, advancing at a more rapid pace than the needles recede, gain on them until the points of the ticklers have reached a position immediately over the eyes of the needles, from which position needles and ticklers together move slightly farther back. Meantime the sinkers have been gradually elevated out of the way by the action of cam $l''$ on truck $n''$, and mechanism connected therewith. (Shown in Fig. 11.) At this stage the points of the ticklers are depressed by action of cam $y$ on truck $x$, and mechanism intervening between said truck and the ticklers $u\ u$, (shown in Fig. 6,) so that such points lie in the eyes of the needles, as at Fig. 14. In this relative position they continue to recede until the ends of the needles are withdrawn through the slots or grooves of the knocking-over bar $k^9$, Fig. 8. In the execution of this part of the movement the point of the tickler, so resting in the eye of the needle, has been forced through the stitch or loop which was on the needle previously, so that, as the needle is drawn back through the slots of the knocking-over bar, a delivery of the stitch onto the tickler is accomplished. At this stage the stitches involved in the narrowing process have been fairly transferred from the needles upon which they were originally formed onto the ticklers, and the said needles have been retired, so as not to interfere with the transfer movement of the stitches laterally onto another set of needles. Here comes in further action of cam $y$ on the tilting mechanism seen in Fig. 6, by which the heads $t\ t$ are rocked, so as to tilt up the points of the ticklers to an elevation free and clear of the barbs of the knitting-needles, as seen in Fig. 15.

Pending the execution of the last above-described movement cams $o'\ o'$, Fig. 9, have been elevating the pawls $w'\ w'$, by means of the mechanism shown in said figure and hereinbefore more fully described, to a position from which they now descend under the action of spring $b''$, and thereby move up the narrowing-racks $x'\ x'$, and, resultantly, through the set-screws $z'\ z'$, the ticklers $u\ u$ to a position opposite and over the needles upon or to which it is designed to deliver the stitches from the ticklers. At this instant, and simultaneously, the ticklers are depressed or tilted, as seen in Fig. 16, and the sinkers, under the action of cam $l''$, have commenced their descent, so that the bottom points thereof have entered between the position of the ends of the needles and in front of the fabric, which position thereof prevents the stitches upon the ticklers from being carried back thereon when the retiring movement thereof is commenced, and also assists to retain them in exact position for the knitting-needles to move up preparatory to receiving said stitches from the ticklers. Here occurs a still further depression of the points of the ticklers, for the purpose of more definitely presenting the loops of the stitches thereon to the approaching end of the knitting-needle. The needles then advance slightly, and the ticklers, still retaining the last-described position, correspondingly recede until the ends of the needles have penetrated the loops of the stitches still suspended on the ticklers.

The relative positions of the several parts involved at this stage of the operation are shown in Fig. 18.

From this point the ticklers finally withdraw from the stitches, leaving them upon the last-mentioned set of needles, and the arms $s\ s$ and bar $k'$ fall back to their dormant position, while the needles are advanced to the front and into position for the knitting to be resumed.

The operation of narrowing having thus been accomplished, there remains to throw out of action the narrowing-cams, and bring into play the knitting mechanism. This is accomplished as follows: At the moment when the knitting-needles have resumed the position last above referred to, and the narrowing-points or ticklers have retreated from action, the edge of cam $b^5$ on disk $d^5$ will have been brought around into position to act upon pin $h^5$ of elbow $i^5$, and the further progressive movement of said cam $b^5$ will thrust over said elbow, so as to result in the elevation into the position seen in Figs. 1 and 19 of the narrowing-tackle—that is, truck Y will be elevated above and out of the path of cam $a^5$, and stud Z will be elevated so that the top end thereof will lie in the path of cam $c^5$. Further progressive movement on the part of disk $d^5$ causes cam $c^5$ to impinge against and thrust to one side stud Z, and thereby cause the shipping-bar M, to which the bracket is attached in which said stud Z works, by means of its several shipping-arms before alluded to, to throw out of operative position the trucks for communicating motion to the narrowing mechanism, and to bring into play the cam-trucks and combinations of mechanism by which the knitting is carried on.

It is sometimes desirable and necessary to knit one straight selvage at the same time that the other selvage is being narrowed. This may be accomplished by turning over or back one of the pawls $w'$, so as to throw the narrowing-rack out of action, and thus prevent the moving up of one of the narrowing-racks $x'$ with its appendages.

In all cases when the same truck or friction-roller is employed in both processes of knitting and narrowing, the cams with which the same co-operates, and which are adjacent to each other, have at one point of their peripheries a common face, which permits the truck to be shipped or shifted from one onto the other without obstruction.

I am aware that friction bowls, rolls, or trucks have heretofore been used in the communication of motion in connection with cams; and I am also aware that, for purposes of suspending temporarily the action or connection between cams and the levers or parts with which they co-operate, the cams have heretofore been arranged to slide out of action axially on the shaft, or, as in other instances, the shaft with cams attached has been moved bodily in the line of its axis out of action.

Neither of these systems of securing intermittent action of the cams and levers do I claim per se.

Several valuable results are secured by the employment of a system of movable trucks over either a system of movable cams or levers, among which may be noticed the following:

In many machines are found cams and levers which operate constantly both in knitting and narrowing, and special construction would be requisite to prevent these being thrown out of action in cases where the shaft is moved endwise. A large amount of detrition or wearing out of shape of the cams and tappets of ordinary construction is avoided by the interposition of a friction-truck, which may be of hardened steel, and almost entirely obviate this fault. A great diminution of friction in the action of the cams is secured, especially where so many cams are employed as in machines of this class. Less force is required to ship these small cams out of action than is required to move a set of levers, a set of cams, or the shaft bodily with cams attached. The movement can be more promptly and easily effected than in the old way. The shock occasioned by the impact of the abrupt or steep faces of the cams against rigid tappets of the old style of construction, which is a great evil in machines of that class, and which involves a serious loss of power, besides rendering all the movements unsteady, irregular, and jerky, is very materially relieved.

I am not aware that machines embracing this feature as a system for accomplishing the purposes enumerated have ever before been used. Hence

I claim as new and desire to secure by Letters Patent—

1. The mechanism provided for communicating reciprocatory movement to the slur-cock and yarn-carrier, consisting of cam-cylinder J, provided with groove $c\ c$ and switch $b$, having lug $i$ mounted upon a shaft, in combination with lever K, provided with friction-roller $n$, and switch-guides $f$ and $h$, attached to said lever and adjusted to operate in connection with switch $b$, all substantially as described and set forth.

2. The mechanism for shifting the position of the vertically-movable driver $a^6$ from its position on one side of projection $g^6$ during one part of the stroke to a corresponding position on the opposite side of said projection preparatory to making the return-stroke, and consisting of shifting-latches $d^6$ and $d^7$, each provided with projections having the inclined faces $e^6\ e^6$ and $f^6\ f^6$, pivoted, as shown, in combination with the vertically-movable driver $a^6$, armed with lug $c^6$, and adjusted to slide in box $b^6$ of the driver-head, all combined and operating substantially as shown and described.

3. The mechanism for determining the pattern or fashion of the piece to be wrought, and the appliances for operating the same, consisting of pattern-cylinder S, having its surface provided with holes adapted to be distributed and closed, substantially as described, so as to construct a system of longitudinal and circumferential ranges, having at one end groove $g^4$, bisected by the diagonal cam-face $f^4$, in combination with hub R and rod W, all arranged, as described, on a shaft actuated by pawl and ratchet, and co-operating with lever $h^4$, armed with pins $i^4\ i^4$, substantially as described and set forth.

4. The mechanism for controlling the action of shipping-bar M and its attachments, consisting of bracket $j^5$, attached to shipping-bar M, provided with movable stud $g^5$, friction-roller Y, movable stud Z, connecting-link $e^5$, pin X, and elbow $i^5$, having projection $h^5$, in combination with disk $d^5$, armed with cams $a^5$, $b^5$, and $c^5$, adapted to be controlled by apertures in pattern-cylinder S, substantially as described and set forth.

5. The described means for controlling the various knitting and narrowing movements of fashioning knitting-machines through the agency of axially-movable trucks or friction rolls, working in conjunction with fixed cams, the shippers of which trucks are all attached to a common shipping-bar, arranged to be actuated by a narrowing-tackle dependent for its movements on a pattern-cylinder, all constructed, combined, and operating substantially as described and set forth.

6. The mechanism for stopping the machine at the termination of the pattern, consisting of lug $n^5$ or pin on pattern-cylinder, arm T of shaft U, latch $p^5$ thereon, and catch $o^5$ on belt-shipper $v$, all combined, arranged, and operating substantially as described and set forth.

7. The described means for regulating the length of traverse of the yarn-carrier, and for moving narrowing-points, consisting of cams $o'\ o'$, trucks $p'\ p'$, levers $s'\ s'$, vertical slides $u'$ $w'$, spring $b''$, pawls $w'$ $w'$, and narrowing-racks $x'$ $x'$, with their described attachments, combined, arranged, and operating substantially as described and set forth.

8. The cam-cylinder J, having slot $d$, in combination with latch $e$, attached to shipping-bar M, by means of which said cam-cylinder is locked while the operation of narrowing is progressing, substantially as described and set forth.

In testimony whereof I have hereto set my hand at Bennington, Vermont, this 18th day of June, A. D. 1877.

ELI TIFFANY.

In presence of—
CHARLES F. PRICHARD,
FRANKLIN SCOTT.